(12) United States Patent
Yang

(10) Patent No.: US 9,282,607 B2
(45) Date of Patent: Mar. 8, 2016

(54) LED DEVICE WITH SHARED VOLTAGE-LIMITING UNIT AND INDIVIDUAL EQUALIZING RESISTANCE

(71) Applicant: Tai-Her Yang, Dzan-Hwa (TW)

(72) Inventor: Tai-Her Yang, Dzan-Hwa (TW)

( * ) Notice: Subject to any disclaimer, the term of this patent is extended or adjusted under 35 U.S.C. 154(b) by 0 days.

(21) Appl. No.: 14/447,373

(22) Filed: Jul. 30, 2014

(65) Prior Publication Data

US 2014/0339992 A1    Nov. 20, 2014

Related U.S. Application Data

(63) Continuation of application No. 13/025,284, filed on Feb. 11, 2011, now Pat. No. 8,823,269.

(51) Int. Cl.
*H05B 33/08* (2006.01)

(52) U.S. Cl.
CPC .......... *H05B 33/0824* (2013.01); *H05B 33/083* (2013.01); *H05B 33/0809* (2013.01); *H05B 33/0821* (2013.01); *H05B 33/0827* (2013.01); *Y02B 20/341* (2013.01)

(58) Field of Classification Search
CPC .... H05B 33/08; H05B 33/0884; H05B 37/00; H05B 37/02; H05B 37/03; H05B 41/16; H05B 41/24; H05B 41/36
USPC ............ 315/122, 129–132, 185 R, 192, 291, 315/294, 297; 362/543, 545, 565, 568, 612, 362/800; 307/36, 37, 38
See application file for complete search history.

(56) References Cited

U.S. PATENT DOCUMENTS

| | | | |
|---|---|---|---|
| 6,628,085 B2 * | 9/2003 | Yang | 315/291 |
| 8,410,705 B2 * | 4/2013 | Bollmann et al. | 315/119 |
| 2009/0289267 A1 * | 11/2009 | Burdalski et al. | 257/88 |
| 2010/0072905 A1 | 3/2010 | Kim et al. | |
| 2011/0127920 A1 | 6/2011 | Huang et al. | |

* cited by examiner

*Primary Examiner* — Thai Pham
(74) *Attorney, Agent, or Firm* — Bacon & Thomas, PLLC

(57) ABSTRACT

The present invention relates to a LED device with shared voltage-limiting unit and individual voltage-equalizing resistance, wherein two ends of a LED set constituted by a plurality of same-polarity series LEDs are in parallel connected with a shared voltage-limiting unit, and two ends of individual LED are respectively in parallel connected with an voltage-equalizing resistance for providing an overvoltage protection to the LEDs.

13 Claims, 3 Drawing Sheets

LED DEVICE WITH SHARED VOLTAGE-LIMITING UNIT AND INDIVIDUAL EQUALIZING RESISTANCE

This application is a Continuation application of U.S. patent application Ser. No. 13/025,284, filed Feb. 11, 2011, entitled "LED Device with Shared Voltage-Limiting Unit and Individual Equalizing Resistance" which is hereby incorporated by reference in its entirety.

BACKGROUND OF THE INVENTION (a) Field of the Invention

According to the present invention, hereinafter the term "LED" is the abbreviation of the light-emitting diode;

The present invention relates to a LED device with shared voltage-limiting unit and individual voltage-equalizing resistance, wherein two ends of a LED set constituted by a plurality of same-polarity series LEDs are in parallel connected with a shared voltage-limiting unit, and two ends of individual LED are respectively in parallel connected with an voltage-equalizing resistance for providing an overvoltage protection to the LEDs, so when surge voltage from a power source is generated, the surge voltage can be absorbed by the shared voltage-limiting unit, so that individual LED is protected from being damaged due to instant overvoltage or overcurrent.

(b) Description of the Prior Art

Conventional LEDs usually parallel connect with the voltage-limiting units at two ends of each LED, such as the zener diode, to constitute the light-emitting unit, thereby when the end voltage of LED is abnormally increased, the abnormal voltage is absorbed by the zener diode; however, when the light-emitting units being parallel connected by the above mentioned LED and the zener diode are series connected (including series-parallel connected) in plural sets to constitute the light-emitting unit, the voltage is not able to be evenly distributed due to the different properties of the LED and the zener diode, so that when subject to abnormal high voltage, the LED loaded with higher end voltage is passed by the higher current therefore the LED is often damaged.

SUMMARY OF THE INVENTION

The present invention provides a LED device with shared voltage-limiting unit and individual voltage-equalizing resistance, wherein two ends of a LED set constituted by a plurality of normal-polarity series LEDs are in parallel connected with a shared voltage-limiting unit, and two ends of individual LED are respectively in parallel connected with an voltage-equalizing resistance for providing an overvoltage protection to the LEDs

DESCRIPTION OF MAIN COMPONENT SYMBOLS

101: LED Light-emitting diode
105: Voltage-limiting unit
106: Diode
107: Voltage-equalizing resistance

DETAILED DESCRIPTION OF THE PREFERRED EMBODIMENTS

Conventional LEDs usually parallel connect with the voltage-limiting units at two ends of each LED, such as the zener diode, to constitute the light-emitting unit, thereby when the end voltage of LED is abnormally increased, the abnormal voltage is absorbed by the zener diode; however, when the light-emitting units being parallel connected by the above mentioned LED and the zener diode are series connected (including series-parallel connected) in plural sets to constitute the light-emitting unit, the voltage is not able to be evenly distributed due to the different properties of the LED and the zener diode, so that when subject to abnormal high voltage, the LED loaded with higher end voltage is passed by the higher current therefore the LED is often damaged.

The present invention relates to a LED device with shared voltage-limiting unit and individual voltage-equalizing resistance, wherein two ends of a LED set constituted by a plurality of normal-polarity series LEDs are in parallel connected with a shared voltage-limiting unit, and two ends of individual LED are respectively in parallel connected with an voltage-equalizing resistance for providing an overvoltage protection to the LEDs, so when surge voltage from a power source is generated, the surge voltage can be absorbed by the shared voltage-limiting unit, so that individual LED is protected from being damaged due to instant overvoltage or overcurrent.

Figure 1:
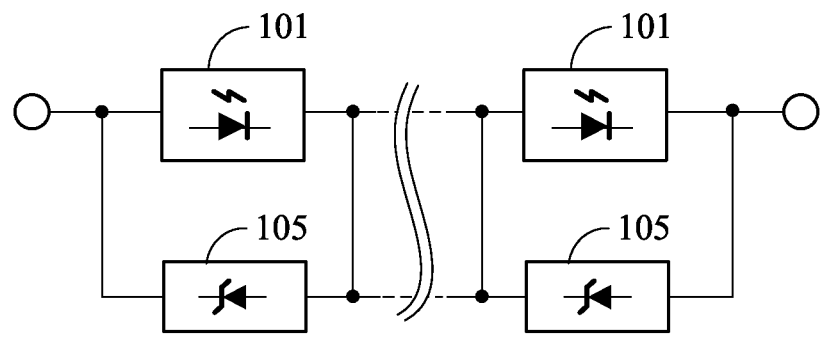
FIG. 1 is a circuit schematic diagram showing that a conventional light-emitting unit is constituted by a LED being in parallel connected with a voltage-limiting unit, and two or more than two of the light-emitting units are series connected in same-polarity to constitute the light-emitting unit set.

FIG. 1 is a circuit schematic diagram showing that a conventional light-emitting unit is constituted by a LED being in parallel connected with a voltage-limiting unit, and two or more than two of the light-emitting units are series connected in same-polarity to constitute the light-emitting unit set.

As shown in FIG. 1, a light-emitting unit is constituted by a LED being in same-polarity parallel connected with a zener diode, and two or more than two of the light-emitting units are series connected or series-parallel connected, in the same polarity to constitute the light-emitting unit set.

Figure 2:
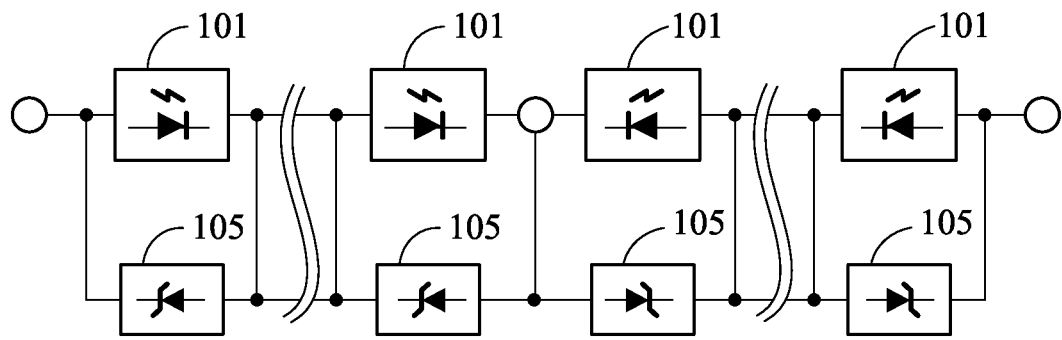
FIG. 2 is a schematic view showing a conventional LED device constituted by two light-emitting unit sets being series connected in the reverse polarity.

FIG. 2 is a schematic view showing a conventional LED device constituted by two light-emitting unit sets being series connected in the reverse polarity.

As shown in FIG. 2, the main structure is that a light-emitting unit is constituted by a LED being in parallel connected with a zener diode, and two or more than two of the mentioned are series connected in the same polarity to constitute the light-emitting unit set, and two or more than two of the mentioned light-emitting unit sets are series connected in reverse polarity to constitute the LED device.

Figure 3:
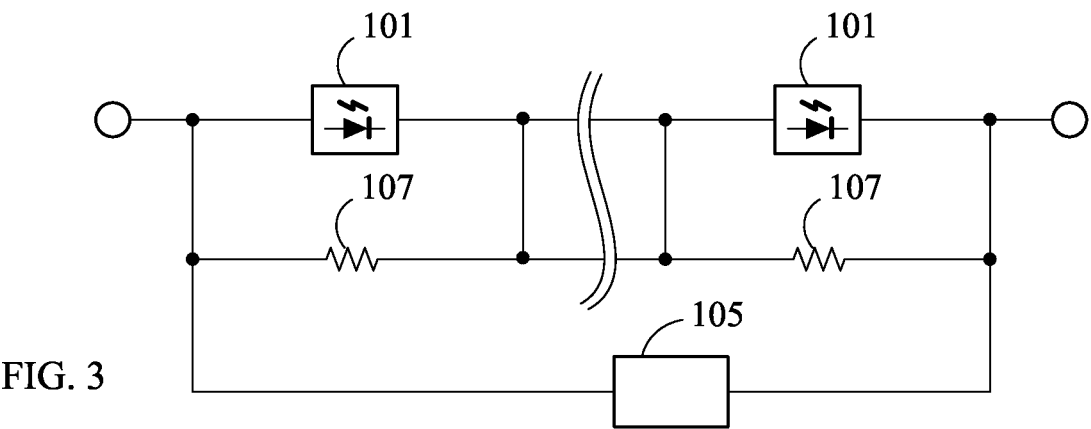
FIG. 3 is a circuit schematic diagram of the present invention showing that two or more than two series-connected LED sets in the same polarity are parallel connected with a shared voltage-limiting unit at two ends thereof, and two ends of individual LED are respectively in parallel connected with an voltage-equalizing resistance and thereby constitute the light-emitting unit.

FIG. 3 is a circuit schematic diagram of the present invention showing that two or more than two series-connected LED sets in the same polarity are parallel connected with a shared voltage-limiting unit at two ends thereof, and two ends of individual LED are respectively in parallel connected with an voltage-equalizing resistance and thereby constitute the light-emitting unit.

Figure 4:
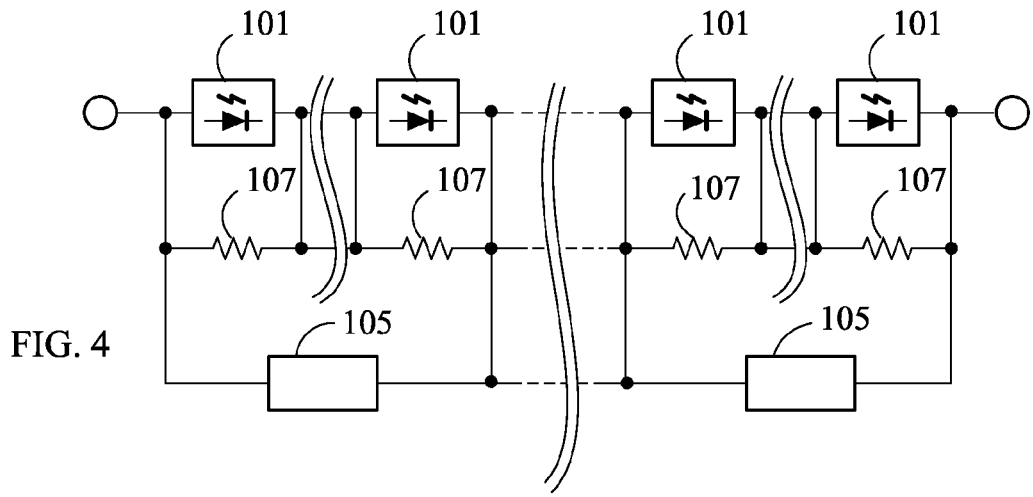
FIG. 4 is a circuit schematic diagram showing that the plural light-emitting units as shown in FIG. 3 are series connected or series-parallel connected in the same polarity to constitute the light-emitting unit set.

As shown in FIG. 3, it mainly consists of:
LED (101): constituted by the light emitting diodes;
Voltage-limiting unit (105): constituted by a semiconductor unit, e.g. a zener diode or a varistor, with a property of the resistance thereof being rapidly reduced when subject to overvoltage;
Voltage-equalizing resistance (107): constituted by the resistive component and served to be parallel connected at two ends of each LED;
a light-emitting unit is structured through parallel connecting a shared voltage-limiting unit (105) at two ends of two or more than two series-connected LEDs (101) in the same polarity, and parallel connecting with the voltage-equalizing resistance (107) at two ends of each individual LED (101);

FIG. 4 is a circuit schematic diagram showing that the plural light-emitting units as shown in FIG. 3 are series connected or series-parallel connected in the same polarity to constitute the light-emitting unit set.

As shown in FIG. 4, it mainly consists of:
LED (101): constituted by the light emitting diodes;
Voltage-limiting unit (105): constituted by a semiconductor unit, e.g. a zener diode or a varistor, with a property of the resistance thereof being rapidly reduced when subject to overvoltage;
Voltage-equalizing resistance (107): constituted by the resistive component and served to be parallel connected at two ends of each LED;
a light-emitting unit is structured through parallel connecting a shared voltage-limiting unit (105) at two ends of two or more than two series-connected LEDs (101) in the same polarity, and parallel connecting with the voltage-equalizing resistance (107) at two ends of each individual LED (101);
A light-emitting unit set is structured through series connecting or series-parallel connecting the plural mentioned light-emitting units in the same polarity.

Figure 5:
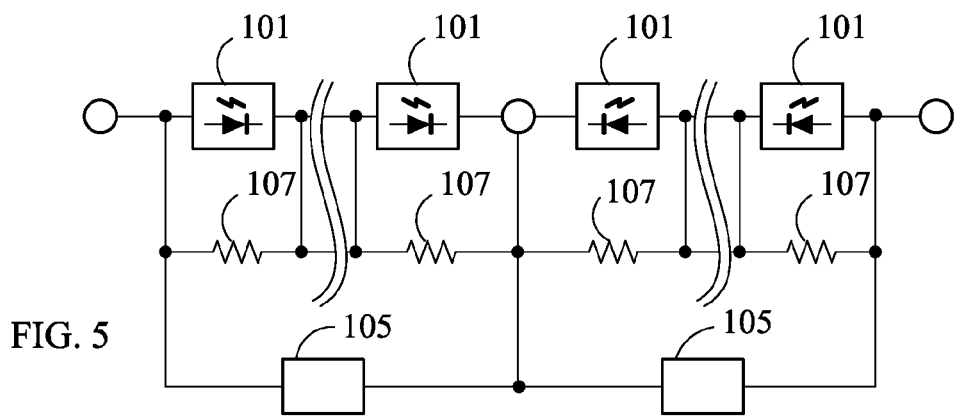
FIG. 5 is an applied circuit schematic diagram of present invention showing that two light-emitting units as shown in FIG. 3 are series connected in reverse polarity.

FIG. 5 is an applied circuit schematic diagram of present invention showing that two light-emitting units as shown in FIG. 3 are series connected in reverse polarity.

As shown in FIG. 5, it mainly consists of:
LED (101): constituted by the light emitting diodes;
Voltage-limiting unit (105): constituted by a semiconductor unit, e.g. a zener diode or a varistor, with a property of the resistance thereof being rapidly reduced when subject to overvoltage;
Voltage-equalizing resistance (107): constituted by the resistive component and served to be parallel connected at two ends of each LED;
a light-emitting unit is structured through parallel connecting a shared voltage-limiting unit (105) at two ends of two or more than two series-connected LEDs (101) in the same polarity, and parallel connecting with the voltage-equalizing resistance (107) at two ends of each individual LED (101);
The application is structured through series connecting two mentioned light-emitting units in reverse polarity.

Figure 6:
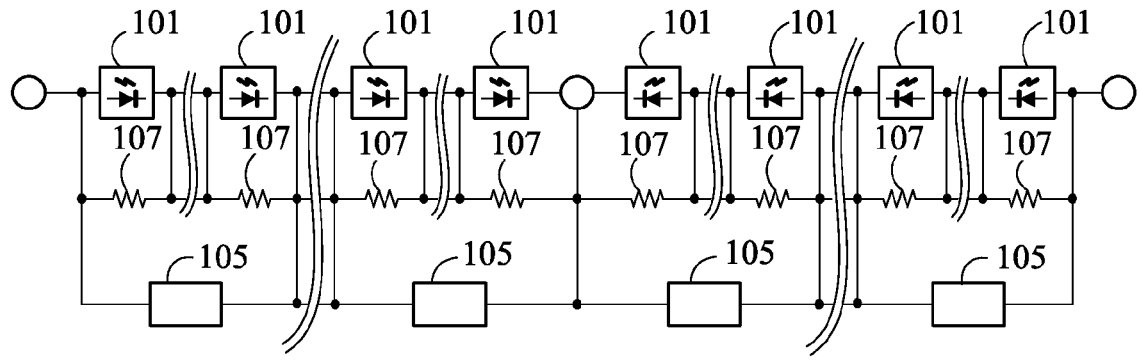
FIG. 6 is an applied circuit schematic diagram of present invention showing that two or more than two light-emitting unit sets as shown in FIG. 4 are series connected in the reverse polarity.

FIG. 6 is an applied circuit schematic diagram of present invention showing that two or more than two light-emitting unit sets as shown in FIG. 4 are series connected in the reverse polarity.

As shown in FIG. 6, it mainly consists of:
LED (101): constituted by the light emitting diodes;
Voltage-limiting unit (105): constituted by a semiconductor unit, e.g. a zener diode or a varistor, with a property of the resistance thereof being rapidly reduced when subject to overvoltage;
Voltage-equalizing resistance (107): constituted by the resistive component and served to be parallel connected at two ends of each LED;
a light-emitting unit is structured through parallel connecting a shared voltage-limiting unit (105) at two ends of two or more than two series-connected LEDs (101) in the same polarity, and parallel connecting with the voltage-equalizing resistance (107) at two ends of each individual LED (101);
A light-emitting unit set is structured through series connecting or series-parallel connecting the plural mentioned light-emitting units in the same polarity;
The application is structured through series connecting two or more than two of the mentioned light-emitting unit in the reverse polarity.

Figure 7:
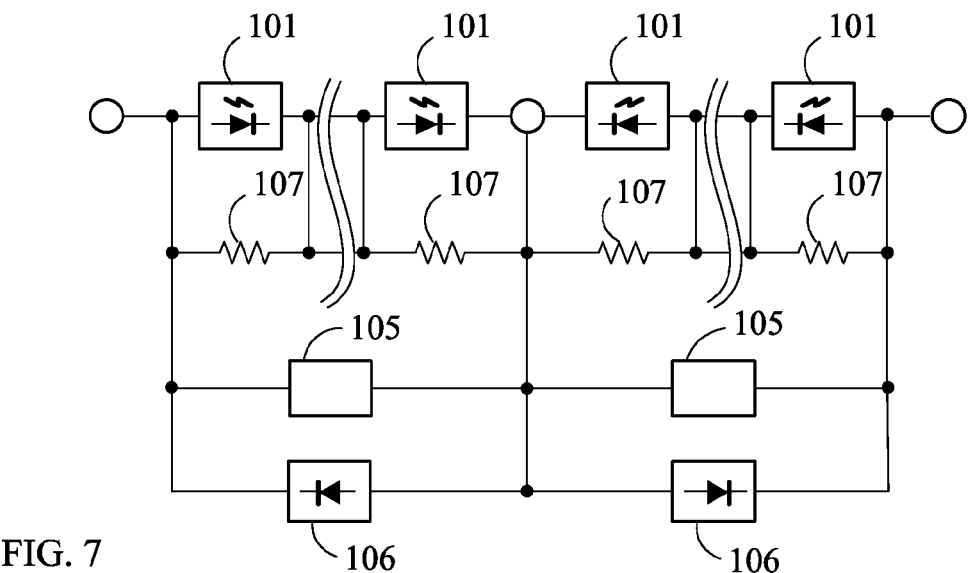
FIG. 7 is an applied circuit schematic diagram of present invention showing that the two ends of the two series-connected light-emitting units in the reverse polarity as shown in FIG. 5 are respectively parallel connected with the diodes in the reverse polarity.

FIG. 7 is an applied circuit schematic diagram of present invention showing that the two ends of the two series-connected light-emitting units in the reverse polarity as shown in FIG. 5 are respectively parallel connected with the diodes in the reverse polarity.

As shown in FIG. 7, it mainly consists of:
LED (101): constituted by the light emitting diodes;
Voltage-limiting unit (105): constituted by a semiconductor unit, e.g. a zener diode or a varistor, with a property of the resistance thereof being rapidly reduced when subject to overvoltage;
Voltage-equalizing resistance (107): constituted by the resistive component and served to be parallel connected at two ends of each LED;
a light-emitting unit is structured through parallel connecting a shared voltage-limiting unit (105) at two ends of two or more than two series-connected LEDs (101) in the same polarity, and parallel connecting with the voltage-equalizing resistance (107) at two ends of each individual LED (101);
Two of the mentioned light-emitting units are series connected in the reverse polarity;
And two ends of the series-connected light-emitting units in the reverse polarity are respectively parallel connected with the diodes (6) in the reverse polarity.

Figure 8:
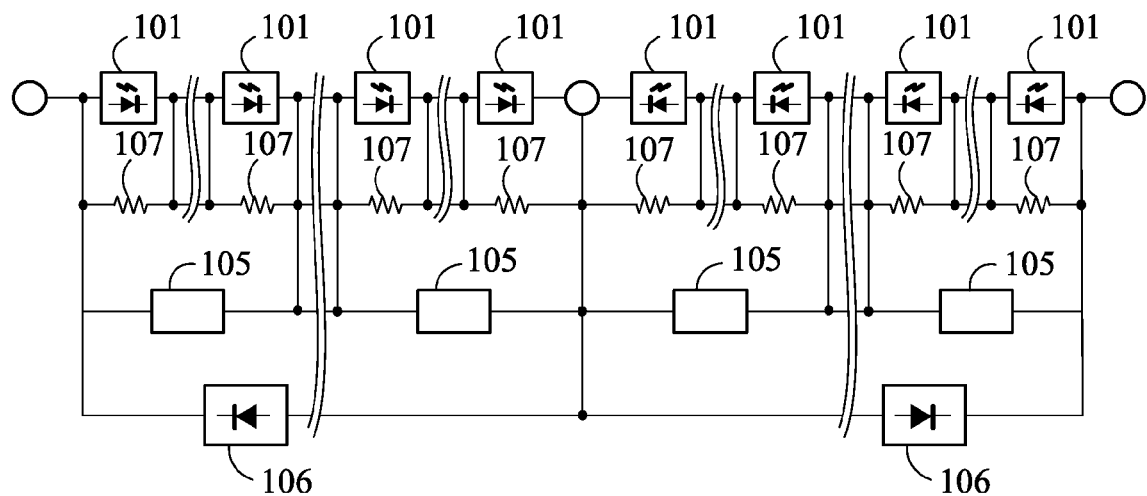
FIG. 8 is an applied circuit schematic diagram of present invention showing that the two ends of same-polarity series light-emitting unit sets of different polarity sides, which are series connected in the reverse polarity, as shown in FIG. 6 are respectively parallel connected with the diode in the reverse polarity.

FIG. 8 is an applied circuit schematic diagram of present invention showing that the two ends of same-polarity series light-emitting unit sets of different polarity sides, which are series connected in the reverse polarity, as shown in FIG. 6 are respectively parallel connected with the diode in the reverse polarity;

As shown in FIG. 8, it mainly consists of:
LED (101): constituted by the light emitting diodes;

Voltage-limiting unit (105): constituted by a semiconductor unit, e.g. a zener diode or a varistor, with a property of the resistance thereof being rapidly reduced when subject to overvoltage;

Voltage-equalizing resistance (107): constituted by the resistive component and served to be parallel connected at two ends of each LED;

a light-emitting unit is structured through parallel connecting a shared voltage-limiting unit (105) at two ends of two or more than two series-connected LEDs (101) in the same polarity, and parallel connecting with the voltage-equalizing resistance (107) at two ends of each individual LED (101);

The light-emitting unit sets is structure through series connecting or series-parallel connecting plural mentioned light-emitting units in the same polarity;

Two or more than two sets of the mentioned light-emitting unit sets are series connected in the reverse polarity;

and in the two reverse-polarity series light-emitting unit sets that belong to different polarity sides, the two ends of the plural light-emitting unit sets in same-polarity series (or series and parallel) connection are respectively parallel connected with the diode (106) in the reverse polarity.

According to the LED device with shared voltage-limiting unit and individual voltage-equalizing resistance of the present invention, the mentioned LED (101) can not only be structured with a single LED (101), but two or more than two LEDs (101) can be provided for structuring a LED unit through connecting the LEDs in series, in parallel or in series and parallel to replace the single LED (101).

According to the LED device with shared voltage-limiting unit and individual voltage-equalizing resistance of the present invention, the voltage-limiting protective unit consists one or morn than more of the following units, wherein one or more than one units being in same-polarity series, parallel or series and parallel connection, which include:
zener diode;
varistor;
diode with property of forward voltage drop;
zener diode with property of reverse-polarity forward voltage drop.

According to the present invention, the power source for the provided LED device can be a constant-current power source or constant-voltage power source, or a current-limiting power source or voltage-limiting power source, or a power source wherein voltage and current not being particularly controlled; for cooperating the operation of the voltage-limiting unit of the present invention, an internal impedance at an output end of the power source or an impedance unit between the output end of the power source and the loading can be further provided, so when the voltage of the power source is altered, the current passing through the voltage-limiting unit generates a voltage drop at the two ends of the impedance unit, and a voltage regulation effect is provided to the voltage at the two ends of the LED device of the present invention.

The invention claimed is:

1. An LED device with shared voltage-limiting unit and individual voltage-equalizing resistance, comprising:
   a light-emitting unit, comprising a plurality of LEDs connected in series and in a same polarity;
   a plurality of voltage-equalizing resistance corresponding to said plurality of LEDs, wherein
   each voltage-equalizing resistance is connected in parallel at ends of a corresponding LED; and
   the shared voltage-limiting unit connected in parallel at two ends of two or more than two of the series-connected LEDs, the voltage-limiting unit including a semiconductor unit having a resistance that is rapidly reduced when subject to overvoltage and the voltage-equalizing resistance including a resistive component;
   wherein when a surge voltage from a power source is generated, the surge voltage can be absorbed by the shared voltage-limiting unit and the voltage is evenly distributed by the voltage-equalizing resistance to two ends of the LED connected in parallel with each voltage-equalizing resistance, so that each LED is protected from being damaged due to instant overvoltage.

2. An LED device comprising:
   a plurality of light-emitting units, wherein each of the light emitting units comprises:
   a plurality of LEDs connected together;
   a plurality of voltage-equalizing resistance corresponding to said plurality of LEDs, wherein
   each voltage-equalizing resistance is connected in parallel at ends of a corresponding LED; and
   a shared voltage-limiting unit connected in parallel at two ends of two or more than two of the series-connected LEDs, the voltage-limiting unit including a semiconductor unit having a resistance that is rapidly reduced when subject to overvoltage and the voltage-equalizing resistance including a resistive component;
   wherein the light-emitting units are connected together in series to define at least one light-emitting unit set; and
   wherein when a surge voltage from a power source is generated, the surge voltage can be absorbed by the shared voltage-limiting unit and the voltage is evenly distributed by the voltage-equalizing resistance to two ends of the LED connected in parallel with each voltage-equalizing resistance, so that each LED is protected from being damaged due to instant overvoltage.

3. The LED device of claim 2, wherein said light-emitting units are connected together in series in a same polarity.

4. The LED device of claim 2, wherein said light-emitting units are connected together in series in an opposite polarity.

5. The LED device of claim 2, wherein said light-emitting units are connected together in series to define a plurality of light-emitting unit sets.

6. The LED device of claim 5, wherein said light-emitting unit sets are connected together in series in an opposite polarity.

7. The LED device of claim 2, wherein said plurality of LEDs of said light emitting units are connected in series.

8. The LED device of claim 2, wherein said voltage limiting unit comprises at least one of a zener diode, a varistor, a diode with a property of a forward voltage drop or a zener diode with a property of reverse-polarity forward voltage drop.

9. The LED device of claim 2, wherein said voltage limiting unit comprises at least two components each selected from: a zener diode, a varistor, a diode with a property of a forward voltage drop or a zener diode with a property of reverse-polarity forward voltage drop; the components being arranged in a same-polarity in series, parallel or series/parallel connection.

10. An LED device with shared voltage-limiting unit and individual voltage-equalizing resistance, comprising:
   a light-emitting unit, comprising a plurality of LEDs connected together in a same polarity;
   a plurality of voltage-equalizing resistance corresponding to said plurality of LEDs, wherein
   each voltage-equalizing resistance is connected in parallel at ends of a corresponding LED; and
   the shared voltage-limiting unit connected in parallel at two ends of two or more than two of the series-connected LEDs, the voltage-limiting unit including a semiconductor unit having a resistance that is rapidly reduced when subject to overvoltage and the voltage-equalizing resistance including a resistive component;

wherein when a surge voltage from a power source is generated, the surge voltage can be absorbed by the shared voltage-limiting unit and the voltage is evenly distributed by the voltage-equalizing resistance to two ends of the LED connected in parallel with each voltage-equalizing resistance, so that each LED is protected from being damaged due to instant overvoltage.

11. The LED device of claim 10, wherein said plurality of LEDs of said light emitting unit comprises at least one set of LEDs connected in series.

12. The LED device of claim 10, wherein said voltage limiting unit comprises at least one of a zener diode, a varistor, a diode with a property of a forward voltage drop or a zener diode with a property of reverse-polarity forward voltage drop.

13. The LED device of claim 10, wherein said voltage limiting unit comprises at least two components selected each from: a zener diode, a varistor, a diode with a property of a forward voltage drop or a zener diode with a property of reverse-polarity forward voltage drop; the components being arranged in a same-polarity in series, parallel or series/parallel connection.

* * * * *